United States Patent

[11] 3,602,582

[72] Inventor  Ugo Torricelli
              239 Central Park West, New York, N.Y.
              10024
[21] Appl. No. 759,118
[22] Filed     Sept. 11, 1968
[45] Patented  Aug. 31, 1971

[54] TRIPTYCH CINEMATOGRAPHIC SYSTEM
     4 Claims, 5 Drawing Figs.
[52] U.S. Cl. .................................................. 352/40,
                                 352/41, 352/131, 352/133
[51] Int. Cl. ............................................ G03b 21/32
[50] Field of Search .................................. 352/40, 41,
         42, 85, 131, 133, 99, 135, 70, 72; 35/35.3; 353/63,
                                                       64, 65

[56]              References Cited
              UNITED STATES PATENTS
2,928,311  3/1960  Strauss ........................  352/131 X
3,205,765  9/1965  Zoltai ..........................  352/133 X
3,225,648  12/1965 Toler ...........................  353/85 X
3,225,652  12/1965 Sauppe .........................  353/85 X
2,918,843  12/1959 Smith ..........................  352/70

2,953,964  9/1960  Dresser ........................  352/71
1,806,452  5/1931  Fulgora .......................  352/40
1,869,275  7/1932  Planer .........................  352/40
2,053,689  9/1936  Barnes .........................  352/42
2,090,270  8/1937  Swanson .......................  353/76 X
2,419,041  4/1947  Stewart ........................  352/133 X Primary Examiner—Samuel S. Matthews
Assistant Examiner—Alan Mathews
Attorney—Jacobs and Jacobs ABSTRACT: A cinematographic system is provided comprising three motion picture projectors and three projection screens for films on which the projections are made, each projector having a motor driven zoom lens and toning disc, means for synchronizing the operation of the three projectors, means for correlating the action of the zoom lens and toning disc at each projector and audience participation selection or control means acting on said zoom lens and toning disc correlating means through appropriate circuitry including a computer having a memory bank, whereby the scenes and sequences projected on the screens can be modified and mutations obtained in various respects by the audience and/or retrieved from the memory bank.

PROJECTED IMAGES ON SINGLE SCREEN USING THREE PROJECTORS AND ASSOCIATED ZOOM AND TONING DEVICES

INVENTOR.
UGO TORRICELLI

TRIPTYCH CINEMATOGRAPHIC SYSTEM

The present invention relates to a cinematographic system comprising three motion picture projectors and three projection screens which may be arranged in side-by-side, end-to-end or other relationship or overlapped or superimposed, each motion picture projector having a motor controlled zoom lens and a rotatable toning disc correlatable in their sole and joint movements by motors remotely actuated by audience participation selection or control means having circuitry including a computer and memory bank whereby the subject matter on three motion picture films can be modified and varied in accordance with audience preference governed or selected by the audience present or stored and retrieved and rescreened with or without an audience in a virtually unlimited number of mutations.

The "triptych" cinematographic system according to the present invention is illustrated in the accompanying drawings in which.

Figure 1:
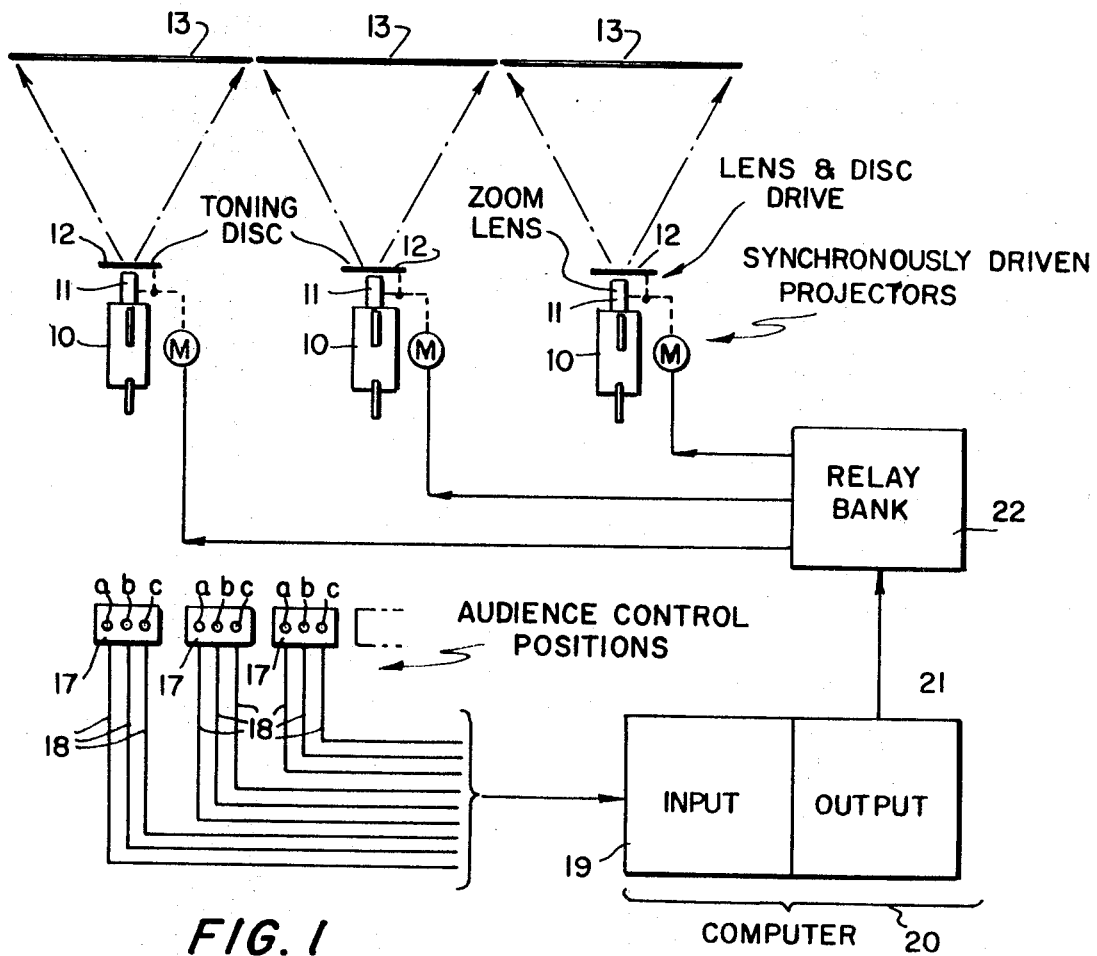
FIG. 1 is a schematic view of a typical or preferred system as a whole.

Referring to the drawings, the numeral 10 designates each of three motion picture projectors and while it is possible within the purview of the invention to have a different number of motion picture projectors, the use of three has been found to be best and is preferred and the invention will therefore be described with reference to this best mode of putting the invention into practice.

Each motion picture projector 10 is or can be any standard or suitable known projector, each of which has a film or set of films which can be passed therethrough in the usual way, but in the present system, the subject matter of the three films is related or interrelated representing, for instance, three phases of the same theme in concurrent evolution or development of the subject matter and with a common narration. Each motion picture projector 10 is provided with a zoom lens 11 which is per se well known and which can be shortened or lengthened ("zoomed" in the usual manner for closeup, distance and other "shots" as desired. Each projector 10 is further provided with a toning disc 12, the preferred segmental form is shown in detail in FIG. 3, and which is mounted to be rotated in front of the zoom lens of its projector and in the optical path between the zoom lens and one of the projection screens 13, it being understood that the projection screens are preferably arranged side-by-side adjacent to one another or if desired, somewhat spaced from one another in a horizontal direction and that the motion picture projectors 10 are correspondingly arranged as shown in FIG. 1, but it is to be understood that the projection screens 13 may be arranged in other manners; i.e., vertically disposed with relation to one another instead of horizontally or even angularly insofar as the noncentral projection screens are concerned so that the end screens will be angularly disposed relative to the planar central screen to obtain special or unusual optical effects or mixing of the subject matter of the films being projected thereon. As will be mentioned hereinafter, the three screens can be superimposed so that all three films are projected onto the same projection screen area, but with different variable sizes of pictures and luminous intensities.

Figure 2:
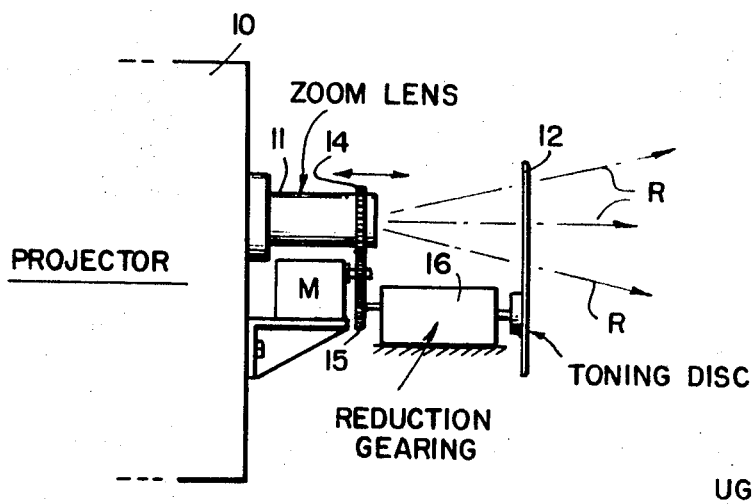
FIG. 2 is an elevational fragmentary view of portions of one projector, zoom lens and toning disc.
Figure 3:
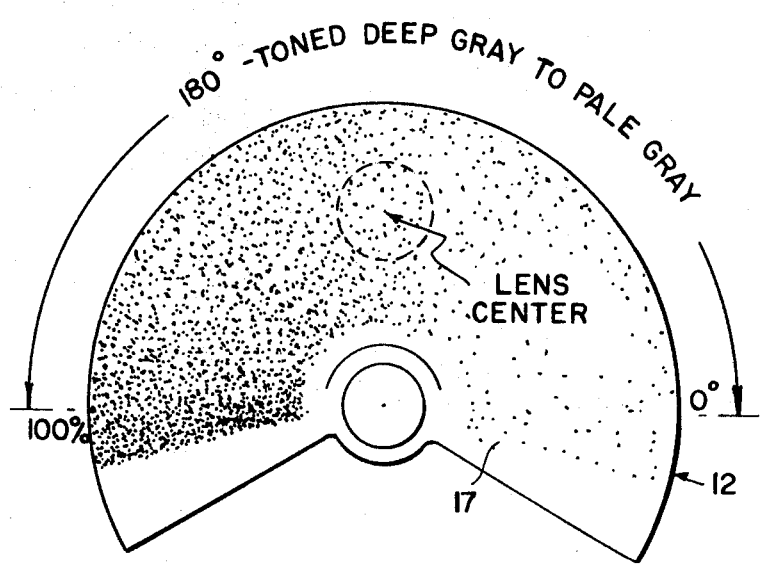
FIG. 3 is a plan view of a segmental toning disc.

Each pair or set made up of a zoom lens and a toning disc is driven by an electric motor M through suitable gearing and/or reduction gearing as shown in FIG. 2. For example, the zoom lens 11 can be provided with an external ring gear 14 and the toning disc 12 is driven either directly by a gear or gear train 15 with or without an interposed reduction gearing box 16 depending upon the relative movements desired to be obtained which can be governed in large part by gear ratios. Each toning gear is made up of a transparent or translucent segment 17 somewhat greater than a half-circle which is "toned" in the sense that the portion marked 100 percent is practically black (deep gray) or dense so that little or almost no light can be transmitted therethrough and this gradually lightens towards the portion marked 0 percent (pale gray) where there is very little or almost no visual or optical obstruction to the passage of projected rays (see rays R in FIG FIG. 2) so that depending upon factors to be hereinafter explained, each toning disc can have a preselected relationship to the related zoom lens and motion picture camera and film. The arcuate distance from 100 percent to 0 percent on the toning disc 17 as shown in FIG. 3 is 180°. A disc of 360° can alternatively be employed. In addition to the related control of the zoom lenses and toning discs, the three motion picture projectors are synchronously interconnected and operated by any suitable or appropriate means.

Thus, it will be seen from the description so far and as the preferred arrangement, there are three motion picture projectors which are adapted to be operated synchronously, each projector has a zoom lens which can be operated to change "distance" or provide closeups, etc., and with each such zoom lens, there is operatively associated a toning disc of the nature described and which modifies the light received by the projection screens in a way to be described and with a wide possibility of variation depending upon audience preference. The arrangement is exceedingly versatile and flexible and lends itself to a variety of programmings, screenings, audience reaction tests and researches, etc.

Figure 4:
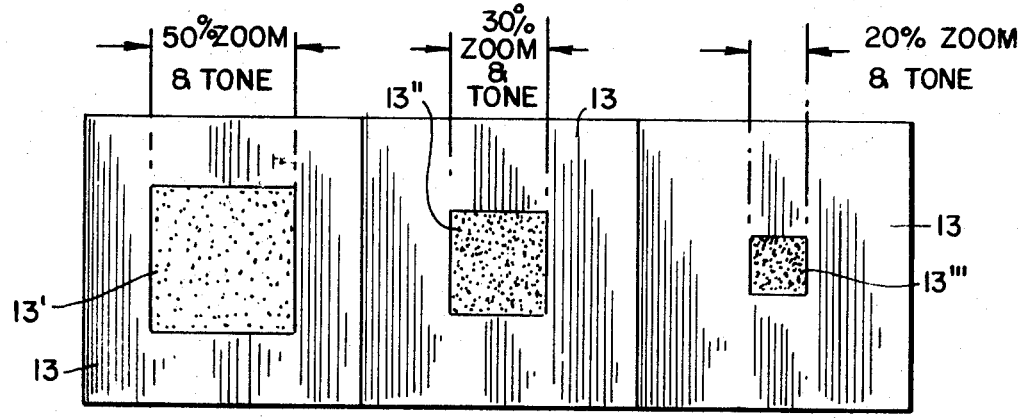
FIG. 4 is an elevational view of the triptych projection screens laterally arranged and showing a representative response to the audience participation control means.

One of the important and highly significant features of the present invention is the combination with the equipment just described of what are for convenience termed audience participation selection means. In FIG. 1, three selection panels or boxes 17 are shown with the understanding that there is one such panel for every person in a given audience and the audience may be of any number ranging from a relative few, such as 10 or 20, up into the hundreds or even thousands and one of the selection panels 17 is provided for each member of the audience in any suitable manner, such as by mounting or hanging the same on the seat or arm of the seat or on the seat in front, such being a matter of convenience for the particular set up. Each control panel 17 is provided with three selection buttons $a$, $b$ and $c$, any one of which can be actuated or pushed in by the member of the audience, and it will further be seen that suitable wiring or circuitry including the electrical conductors 18 lead from the selection panels 17. Each of the actuating buttons is electronically related to one of the three projection screens in that actuation by the audience of these selection buttons causes electrical pulses to enter the input section 19 of computer 20 after proportional tabulation and timed delay and to exit from the output section 21 of such computer into a relay bank 22 leading to motors M. The usual memory devices may be contained in the computer so as to store therewithin the patterns or reactions of audiences where it is desired to compare reactions of different audiences, for example, or the same audience under other conditions and to keep the reactions of a given audience or type of audience, but furthermore from the relay bank impulses go to the motors M which affect the actuation of the zoom lenses and toning discs already described and the entire arrangement is such that while each individual member of a given audience has three choices as will be apparent, the results of the actuation of buttons $a$, $b$ or $c$ is in accordance with the majority vote. Thus, assuming purely for the sake of example and without any limitative or restrictive intent, that there are 100 people in the audience and assuming that 50 people (50 percent) press button $a$, 30 people (30 percent) press button $b$ and 20 people (20 percent) press button $c$, the toning and visual effects appearing on the left-hand screen of FIG. 1 will correspond to the left-hand screen in FIG. 4 wherein the numeral 13 now represents only a border area and the central portion 13' represents what is projected on that screen in response to the preference of 50 percent of the audience and while area 13' for other reasons does not necessarily have to represent 50 percent of the screen area or the largest of the three projections on the screens, such represents the preferred embodiment of the invention. Similarly, central screen 13 has a much smaller image area 13'' and right-hand screen 13 has the smallest image area 13''' because fewest people in the audience actuated button c. In this way changes in luminosity, sizes of images or backgrounds, closeups or distant views, different colors or color intensities and many variables can be controlled by the audience depending upon audience preference and the number of people in the audience who press the respective buttons a, b or c. As a consequence, what is being viewed by the audience can be changed, varied or modified in several respects which can be integrated into the narration if desired so that the audience can be instructed from time to time that it would be appropriate to actuate a button or, alternatively, members of the audience can actuate a button a, b or c at any time when that particular member of the audience desires some alteration or modification of what is appearing on the projection screens. The manner and times for the changes can be made either before the show by verbal instructions to the audience or written instructions can be provided so that each member of the audience will know what will occur when a given button a, b or c is actuated or preferably undirected and uncontrolled audience reaction is obtained. Thus on given subjects, problems, matters to be voted upon or any other subject where the response or reaction of an audience is desired, the present system is applicable and in addition to the alterations occurring on the projection screens as a result of the actuation of the buttons a, b or c, the entire audience response can be stored in the memory bank of the computer and can be retrieved along with other audience reactions or votes for comparative, educational or many other purposes. The particular nature of the computer 20 and relay bank 22 require no description because these are standard items available on the market and consequently the invention resides in the unique overall combination of features and the audience participation control and recording thereof. Such information can be used for the making of future films, for advertising purposes, for determining product preference and a great variety of artistic, cultural, commercial and educational purposes.

Figure 5:
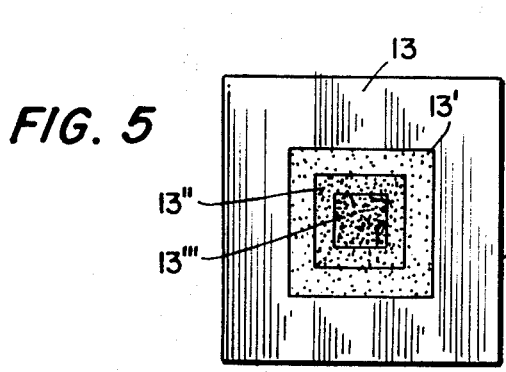
FIG. 5 is a modified projection screen arrangement wherein the three screens are overlapped or superimposed and the projected images are visually and optically combined.

FIG. 5 represents a modified form of the invention wherein the images from the films passing through the three motion picture projectors 10 are converged on a single projection screen 13 instead of on three separate screens as in the previously described form of the invention. In combination with the use of a single screen and the associated zoom lenses and toning discs, composite, combinational and other types of special screenings are possible. The image areas are designated as 13', 13'' and 13''' to indicate that they are the same as or very similar to the screens and image areas of FIG. 4.

In a more general sense, the cinematographic system of the present invention can be widely changed and modified to carry out a variety of different concepts for different purposes. Thus, the three motion picture projectors can use three related films, the subject matter of which is preferably, but not necessarily, related in that one film has background or "distance" subject matter, another has closeup or portraitlike subject matter and the third film can have continuously changing and developing design matter, it being understood, as already explained above, that the three films can have a single sound track and narration, as desired. Thus, one of the primary objectives of the present invention is to produce and show on the screen 13 three parallel and reciprocal integrated films, each of which presents a different aspect of the same subject and as the subject matter of the films progresses or develops, the subject matter can evolve in three different visual and sound sequences but synchronized with one another and with a single sound track or background music and/or narration or played by a synchronized but not variable separate unit. Moreover, each of the three films is so produced that it presents a different point of view of the same basic message or theme even while being integrated and by way of illustration the three films can show three different versions of the same story or three like versions up to a given point beyond which three different endings are possible or the three films provide three different perspectives of the same action as if being witnessed by different people from different points or locations or the three films can represent interrelated aspects of the same underlying or unitary concept or alternatively three contrasting interpretations thereof.

More specifically, one of the three films contain a documentary sequence of facts showing people, machines and products; another film presents the logical demonstration of the theories or concepts underlying the facts and creative visualization and computer graphic development of the thesis and the third film represents a dramatization of the psychological factors by means of abstract designs, landscapes, unique happenings with special optical effects and generally the creation of a psychodynamic climate or ambiance. These three films in a particular embodiment of carrying out the invention and the use of the above described equipment can be projected in such manner that the subject matter on the three films is simultaneously screened from three standard projectors in interlock equipped with toning discs and motor driven zoom lenses on three standard adjacent screens arranged side-by-side in horizontal alignment or endwise of one another in vertical alignment or disposed in a "folding" arrangement wherein one screen is at an angle to the ceiling, another screen is in a vertical position and the third screen is at an angle to the floor or in any other physical relationship, it being understood that the projectors while interlocked and synchronized, can nevertheless be directed wherever desired and wherever the screens are located, and during projection the audience, by means of the selector panel above described, casts votes for its preference and the computer collects the votes and proportionally fluctuates the luminosity, size, focus, closeup or distance and other characteristics of the three projections. The prominence of any one of the films depends on the voting controls and the audience's preference and the most popular film or subject matter becomes the most luminous and covers all or substantially all the surface of its respective screen and can even overflow onto an adjacent screen to give extreme closeups to make the projection, for instance, up to several times full screen size and transparent overlappings, whereas the least preferred film as governed by the audience's selection will fade and become reduced in size to about a TV screen, the third film having intermediate characteristics as will be appreciated from FIG. 4 described above. All the projections can, furthermore, fluctuate in luminosity and with changing "distances" due to movements of the zoom lenses and the viewing of these fluctuations, may be a spectacle in itself. It will further be understood that the least favored film as determined by the audience's preference or selection may become so small and so pale or faint in appearance that the audience may wish to react with a recall vote which can be readily carried out.

As already explained, the results of the audience participation control or selection can be put into a memory bank by known software for comparison with reactions of other audiences or even for subsequent reaction of the same audience to reveal significant patterns or test results which can be retrieved from the computer in known manner. In a modified form of the invention, the computer can be programmed for a preselected automated multiprojection even without audience participation and the versatility and flexibility of the system will, therefore, be more fully appreciated. In addition, the equipment can be operated in a different manner while still using three standard motion picture projectors which are interlocked and synchronized, but arranging the same physically so that they all converge on a single standard screen whereby the audience participation control means or the automated program above referred to will produce overlapping of the three projections in varying degrees of transparency and vignetting. The system can be used on TV stages and for broadcasting purposes with many possible combinations and permutations with three screens, one single screen, audience present, audience absent, programming on tape, TV camera pickups and selection of films and projection conditions by a director in accordance with his own views as how the system should be used most effectively. If desired, the three films can be reproduced as an integral film on a single standard format, for regular projection on a standard screen or the three films can each be projected independently one at a time or in any combination without any special provisions or equipment. The system consequently represents a significant tool for the determination of audience reactions, audience preferences and for various phases of psychodynamic communication. In general, however, the three cinematographic interpretations of any given subject are simultaneously projected on separate but adjacent screens, one of which shows people, machines, objects, etc. in stylized or abstract form, graphic evolutions of technological subjects and esthetics in rhythmic or nonrhythmic progressions and interpretations through music and a romantic atmosphere.

What I claim is:

1. A cinematographic system comprising three driven motion picture projectors each of which is provided with a zoom lens, a rotatable toning disc in front of the zoom lens, each projector being adapted for the passage of a film therethrough the subject matter on which is projected onto a projection screen or screen areas, means for synchronizing the operation of the projectors, means for correlating movements of the zoom lenses with rotation of the toning discs, and audience participation selection and control means for causing proportional variations in the zoom lenses and toning discs for effecting mutations in the projections on the screens.

2. A cinematographic system according to claim 1 in which the three projectors are arranged side-by-side for projection on similarly arranged screens.

3. A cinematographic system according to claim 1 in which the three projectors are arranged for convergent projection on a single screen or screen area.

4. A cinematographic system according to claim 1 in which the audience participation control means includes selection panel boxes having a pushbutton corresponding to each projector and computer means interposed between the panel boxes and the correlating motor means for the zoom lenses and toning discs and electrical circuit forming conductors completing the system.